(12) United States Patent
Takahashi et al.

(10) Patent No.: US 11,929,647 B2
(45) Date of Patent: Mar. 12, 2024

(54) MAGNET- EMBEDDED ROTOR

(71) Applicant: DENSO CORPORATION, Kariya (JP)

(72) Inventors: Yoshiki Takahashi, Kariya (JP); Shun Takeuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 390 days.

(21) Appl. No.: 17/400,995

(22) Filed: Aug. 12, 2021

(65) Prior Publication Data

US 2021/0376673 A1 Dec. 2, 2021

Related U.S. Application Data

(63) Continuation of application No. PCT/JP2020/005205, filed on Feb. 11, 2020.

(30) Foreign Application Priority Data

Feb. 15, 2019 (JP) .................. 2019-025694

(51) Int. Cl.
*H02K 1/276* (2022.01)
*H02K 1/278* (2022.01)
*H02K 15/03* (2006.01)

(52) U.S. Cl.
CPC ............. *H02K 1/276* (2013.01); *H02K 1/278* (2013.01); *H02K 15/03* (2013.01)

(58) Field of Classification Search
CPC ............................... H02K 1/276; H02K 1/278
See application file for complete search history.

(56) References Cited

U.S. PATENT DOCUMENTS

| | | | | |
|---|---|---|---|---|
| 5,159,220 A | * | 10/1992 | Kliman | H02K 1/2766 310/43 |
| 7,622,841 B2 | * | 11/2009 | Yoshikawa | H02K 1/276 310/156.53 |
| 9,003,639 B2 | * | 4/2015 | Haruno | H02K 1/2766 29/598 |
| 9,325,209 B2 | * | 4/2016 | Kojima | H02K 15/03 |
| 2007/0222319 A1 | | 9/2007 | Yoshikawa et al. | |
| 2009/0026867 A1 | * | 1/2009 | Haruno | H02K 1/2766 310/156.21 |
| 2015/0162789 A1 | * | 6/2015 | Tanaka | H02K 1/278 310/156.28 |

FOREIGN PATENT DOCUMENTS

| | | |
|---|---|---|
| JP | 2008-061480 A | 3/2008 |
| JP | 2012-016237 A | 1/2012 |
| JP | 5716377 B2 | 5/2015 |
| JP | 2017-038462 A | 2/2017 |

OTHER PUBLICATIONS

Written Opinion of the International Searching Authority (Year: 2019).*

* cited by examiner

*Primary Examiner* — Robert W Horn
(74) *Attorney, Agent, or Firm* — MASCHOFF BRENNAN

(57) ABSTRACT

A rotor has a rotor core made of a magnetic material, a permanent magnet provided in a magnet insertion hole of the rotor core, and a cushioning material. The cushioning material is provided at a location where a distance between a wall surface of the magnet insertion hole and the permanent magnet is the narrowest, on both sides in a rotational direction with respect to the permanent magnet.

4 Claims, 5 Drawing Sheets

MAGNET-EMBEDDED ROTOR

CROSS REFERENCE TO RELATED APPLICATION

The present application is a continuation application of International Patent Application No. PCT/JP2020/005205 filed on Feb. 11, 2020, which designated the U.S. and claims the benefit of priority from Japanese Patent Application No. 2019-025694 filed on Feb. 15, 2019. The entire disclosures of all of the above applications are incorporated herein by reference.

TECHNICAL FIELD

The present disclosure relates to a magnet-embedded rotor.

BACKGROUND

A magnet-embedded rotor includes a permanent magnet in a magnet insertion hole of a rotor core.

SUMMARY

A magnet-embedded rotor includes a rotor core made of a magnetic material, a permanent magnet provided in a magnet insertion hole of the rotor core, and a cushioning material. The cushioning material is provided at least at a location where a distance between a wall surface of the magnet insertion hole and the permanent magnet is the narrowest, on both sides in a rotational direction with respect to the permanent magnet.

DESCRIPTION OF EMBODIMENT

Figure 1:
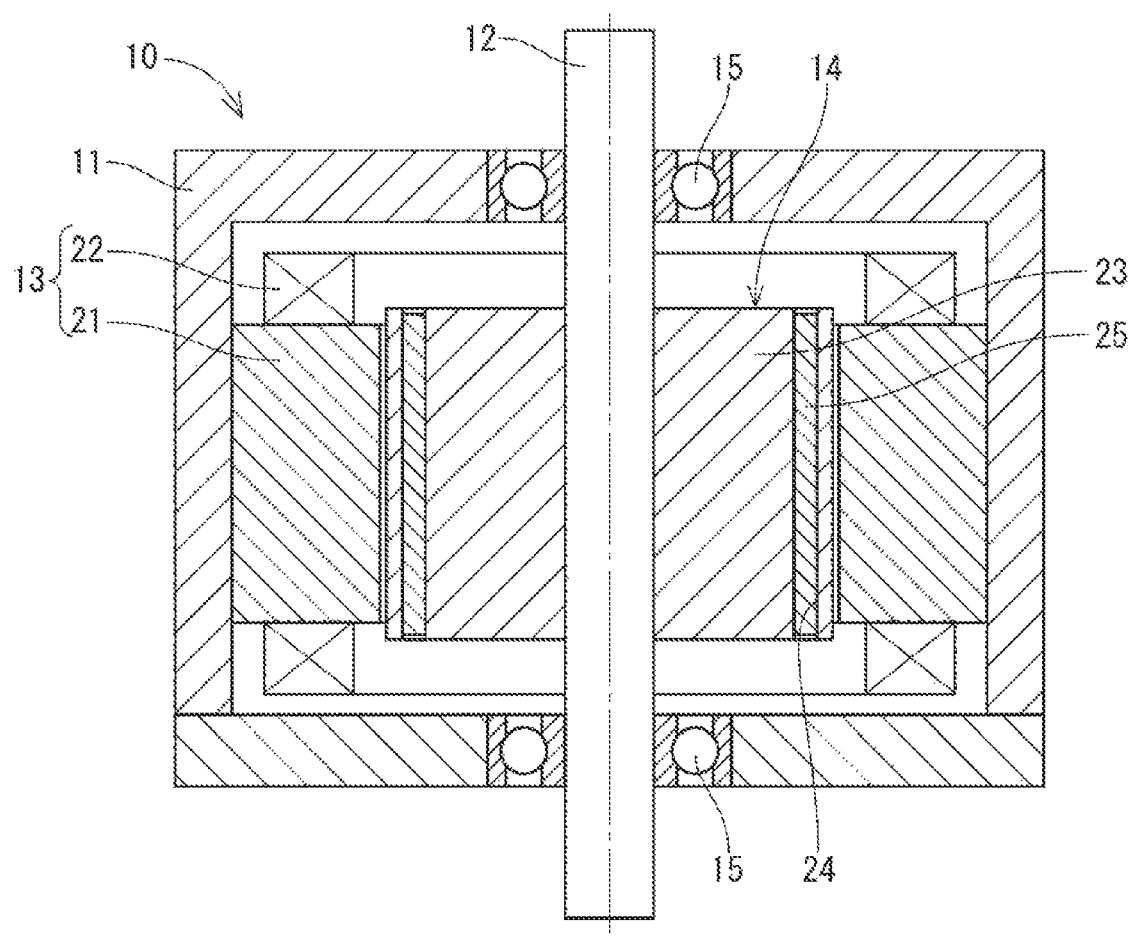
FIG. 1 is a cross-sectional view of a rotary electric machine including an embedded magnet type rotor according to a first embodiment.

To begin with, examples of relevant techniques will be described.

Conventionally, an embedded magnet type rotor includes a permanent magnet disposed in a magnet insertion hole of a rotor core. The permanent magnet is fixed on the inner and outer wall surfaces of the magnet insertion hole in the radial direction. A protruding portion protrudes inward in the radial direction from a bridge located between outer peripheral magnetic pole portions of the rotor core, on both sides in the circumferential direction. The permanent magnet is fixed by adhesion to the tip surface of the protruding portion and the wall surface of the magnet insertion hole in the radial direction.

When the embedded magnet type rotor starts rotating, an electromagnetic force in the circumferential direction acts on the permanent magnet. At this time, if the permanent magnet is not fixed on the rotor core, the permanent magnet moves in the circumferential direction inside the magnet insertion hole and collides with the wall surface of the magnet insertion hole to generate an abnormal noise. In order to prevent the generation of such abnormal noise, it is necessary to apply an adhesive to a wide range of the wall surfaces of the magnet insertion hole on both sides in the radial direction to increase the adhesive strength and secure the fixing of the permanent magnet.

The present disclosure provides an embedded magnet type rotor in which abnormal noise is suppressed at the start of rotation regardless of the fixing force of a permanent magnet.

The embedded magnet type rotor of the present disclosure includes a rotor core made of a magnetic material, a permanent magnet provided in a magnet insertion hole of the rotor core, and a cushioning material provided at least at the place where the distance between the wall surface of the magnet insertion hole and the permanent magnet is the narrowest, on both sides in the rotational direction with respect to the permanent magnet.

The cushioning material in the narrow gap on both sides of the permanent magnet in the rotational direction absorbs the circumferential movement energy of the permanent magnet at the start of rotation. As a result, the collision between the permanent magnet and the wall surface of the magnet insertion hole is suppressed. Therefore, the abnormal noise at the start of rotation is suppressed regardless of the fixing force of the permanent magnet.

Further, since abnormal noise is suppressed without fixing the permanent magnet, the cushioning material does not need a function of fixing the permanent magnet. Therefore, the cushioning material requires a relatively small size in the surface direction of the wall surface of the magnet insertion hole. It is not necessary to apply an adhesive to a wide range of the wall surfaces of the magnet insertion hole on both sides in the radial direction to increase the adhesive strength and secure the fixing force of the permanent magnet as in the conventional case. Therefore, it is possible to reduce the inertia of the embedded magnet type rotor by providing the cushioning material that is smaller than that of the conventional adhesive.

Further, compared with the conventional case where the fixing portion is provided with the adhesive on both sides of the magnet insertion hole in the radial direction, the radial dimension of the magnet insertion hole can be reduced while the radial thickness of the permanent magnet is the same size. Therefore, the radial physique of the embedded magnet type rotor can be reduced.

Hereinafter, embodiments of the embedded magnet type rotor will be described with reference to the drawings. In the embodiments, substantially the same components are denoted by the same reference numerals and description thereof is omitted.

First Embodiment

An embedded magnet type rotor (hereinafter, rotor) according to a first embodiment is applied to a rotary electric machine 10 shown in FIG. 1. The rotary electric machine 10 includes a housing 11, a motor shaft 12, a stator 13, and a rotor 14.

The motor shaft 12 is rotatably supported by the housing 11 via a bearing 15. The stator 13 has a stator core 21 fixed to the housing 11 and a winding 22 assembled to the stator core 21.

Figure 2:
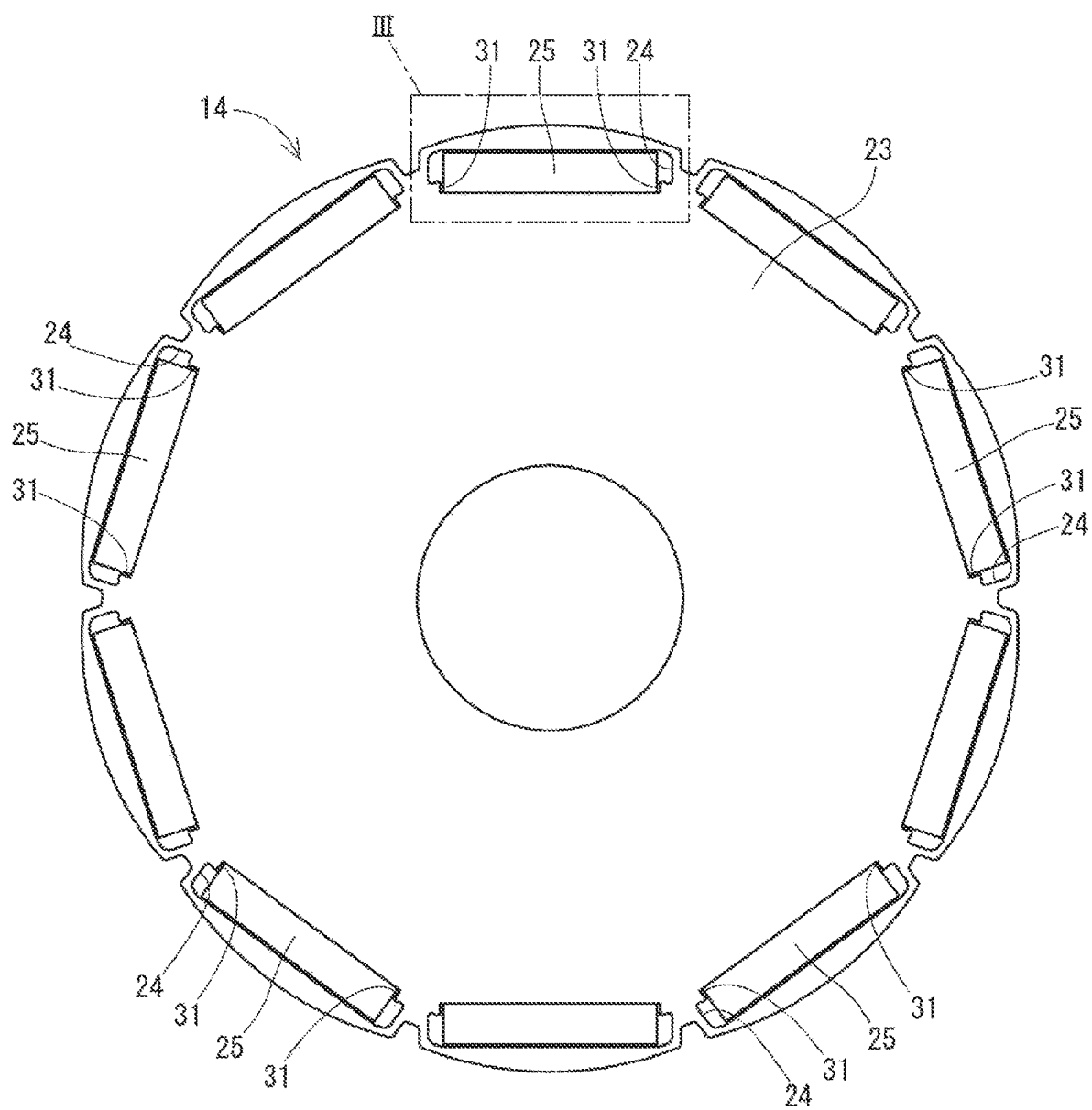
FIG. 2 is a front view of the embedded magnet type rotor of FIG. 1.

As shown in FIGS. 1 and 2, the rotor 14 made of a magnetic material has a rotor core 23 fitted and fixed to the motor shaft 12, and permanent magnets 25 provided in magnet insertion holes 24 of the rotor core 23.

Hereinafter, the radial direction of the rotor 14 is simply referred to as "radial direction", and the circumferential direction of the rotor 14 (that is, the rotational direction) is simply referred to as "circumferential direction" or "rotational direction". The axial direction of the rotor 14 is simply referred to as "axial direction", and the lateral cross section of the rotor 14 is simply referred to as "cross section".

Figure 3:
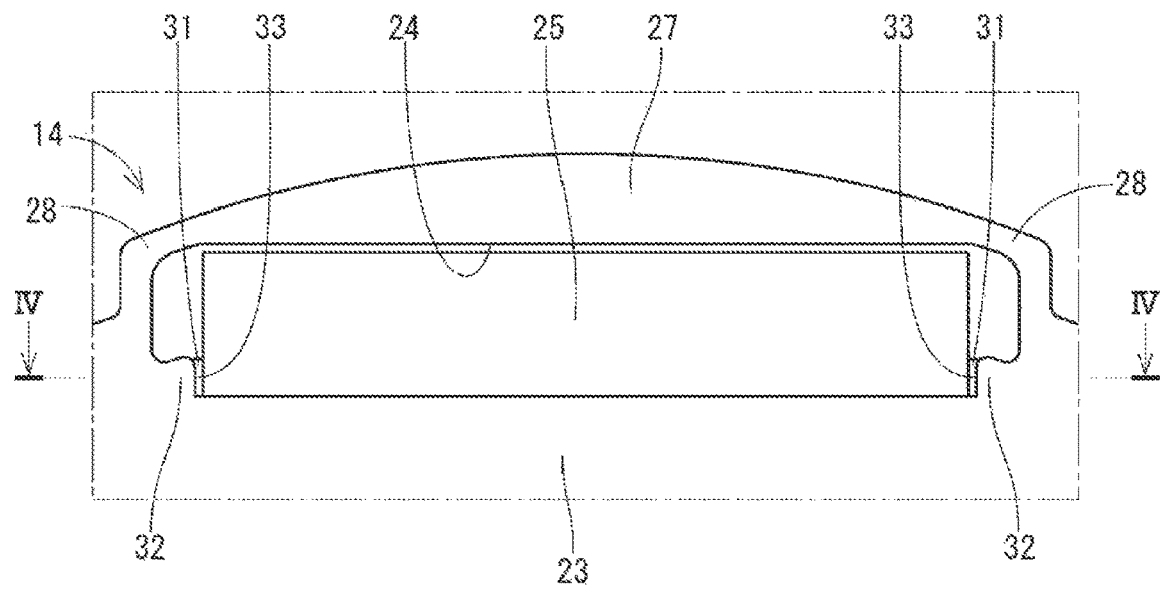
FIG. 3 is an enlarged view of an area III of FIG. 2.

As shown in FIG. 3, the rotor core 23 has a pole portion 27 and a bridge portion 28. The pole portion 27 is located radially outward with respect to the magnet insertion hole 24. The pole portion 27 is formed so as to separate from the circumscribing circle of the rotor core 23 inward in the radial direction, as separating from the magnetic pole center in the circumferential direction. The bridge portion 28 extends inward in the circumferential direction and the radial direction from both sides of the pole portion 27 in the circumferential direction. The permanent magnet 25 has a rectangular cross-section and is arranged so that the thickness direction is along the radial direction.

The rotor 14 rotates by being magnetically attracted or repelled by a rotating magnetic field generated by energization of the winding 22. When the rotor 14 starts rotating in this way, an electromagnetic force acts on the permanent magnet 25 from the stator 13 in the circumferential direction. At this time, if the permanent magnet 25 is not fixed on the rotor core 23, the permanent magnet 25 moves in the circumferential direction inside the magnet insertion hole 24 and collides with the wall surface of the magnet insertion hole 24 to generate an abnormal noise. In order to prevent the generation of such abnormal noise, conventionally, it is necessary to apply an adhesive to a wide range of the wall surfaces of the magnet insertion hole on both sides in the radial direction to increase the adhesive strength and secure the fixing of the permanent magnet.

In contrast, according to the first embodiment, as shown in FIGS. 2 and 3, the rotor 14 includes the cushioning material 31. The cushioning material 31 is provided at least at a location where the distance between the wall surface of the magnet insertion hole 24 and the permanent magnet 25 is the narrowest (hereinafter, the narrowest portion) on both sides in the rotational direction with respect to the permanent magnet 25. The fixing strength of the cushioning material 31 with respect to the rotor core 23 and the permanent magnet 25 in the rotational direction is smaller than the maximum magnetic force acting on the cushioning material 31 by the electromagnetic force from the stator 13 in the rotational direction.

In the first embodiment, the cushioning material 31 is provided between a protrusion 32 formed on the wall of the magnet insertion hole 24 and the permanent magnet 25. The protrusion 32 is formed so as to protrude toward the permanent magnet 25 from the radially inner part of the wall on both sides in the rotational direction to partition the magnet insertion hole 24. The space between the tip end surface 33 of the protrusion 32 and the permanent magnet 25 is the narrowest portion, and the distance between the tip end surface 33 of the protrusion 32 and the permanent magnet 25 is constant.

Figure 4:
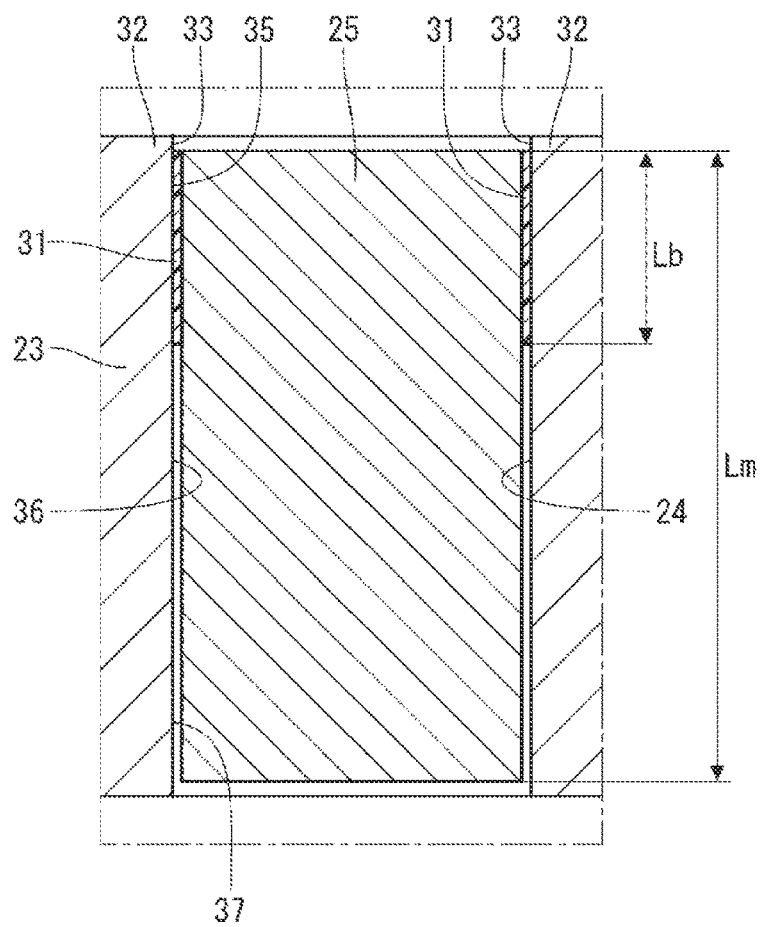
FIG. 4 is a cross-sectional view taken along a line IV-IV of FIG. 3.

The dimension of the permanent magnet 25 is smaller than the internal dimension of the magnet insertion hole 24 in both the radial direction and the rotational direction. As shown in FIG. 4, the permanent magnet 25 is assembled to the rotor core 23 by being inserted into the magnet insertion hole 24 from one side in the axial direction before magnetization. The cushioning material 31 is an elastic member applied to the tip end surface 33 of the protrusion 32 before the permanent magnet 25 is inserted and solidified after the permanent magnet 25 is inserted.

In the first embodiment, the cushioning material 31 is provided at one end 35 of the magnet insertion hole 24 on the magnet insertion side in the axial direction of the rotor core 23. Further, the cushioning material 31 is continuously provided in the axial direction. The ratio of the axial length Lb of the cushioning material to the axial length Lm of the permanent magnet 25 is 30% or more.

As described above, in the first embodiment, the embedded magnet type rotor 14 has the rotor core 23 made of a magnetic material, the permanent magnet 25 provided in the magnet insertion hole 24 of the rotor core 23, and the cushioning material 31. The cushioning material 31 is provided at a position where the distance between the wall surface of the magnet insertion hole 24 and the permanent magnet 25 is the narrowest, on both sides in the rotational direction with respect to the permanent magnet 25.

The cushioning material 31 absorbs the circumferential kinetic energy of the permanent magnet 25 when the rotor starts rotating, since the cushioning material 31 is located in the narrowest portion on both sides of the permanent magnet 25 in the rotational direction. As a result, the collision between the permanent magnet 25 and the wall surface of the magnet insertion hole 24 is suppressed. Therefore, the abnormal noise at the start of rotation is suppressed regardless of the fixing force of the permanent magnet 25.

Further, since the abnormal noise is suppressed without fixing the permanent magnet 25, the cushioning material 31 does not need the function of fixing the permanent magnet 25. Therefore, the size of the cushioning material 31 in the surface direction of the wall surface of the magnet insertion hole 24 can be relatively set smaller. It is not necessary to apply an adhesive to a wide range of the wall surfaces of the magnet insertion hole 24 on both sides in the radial direction to increase the adhesive strength and secure the fixing force of the permanent magnet 25 as in the conventional case. Therefore, the inertia of the embedded magnet type rotor 14 can be reduced by providing the cushioning material 31 which is smaller than the conventional adhesive.

Further, as compared with the conventional case where the fixing portion is provided by the adhesive on both the sides of the magnet insertion hole 24 in the radial direction, the dimension of the magnet insertion hole 24 in the radial direction can be reduced, while the thickness of the permanent magnet 25 is the same size in the radial direction. Thus, the physique of the embedded magnet type rotor 14 in the radial direction can be reduced.

Further, in the first embodiment, the fixing strength of the cushioning material 31 with respect to the rotor core 23 and the permanent magnet 25 in the rotational direction is smaller than the maximum magnetic force acting on the cushioning material 31 in the rotational direction by the electromagnetic force of the stator 13. Even so, since abnormal noise is suppressed, the material for the cushioning material 31 can be selected within the widened range.

Further, in the first embodiment, the wall for partitioning the magnet insertion hole 24 on both sides in the rotational direction has the protrusion 32 protruding from the radially inner part of the wall toward the permanent magnet 25. The cushioning material 31 is provided between the protrusion 32 and the permanent magnet 25. In this way, the cushioning material 31 can be arranged in the narrow place.

Further, in the first embodiment, the cushioning material 31 is provided at the one end 35 of the magnet insertion hole 24 in the axial direction of the rotor core 23, which is adjacent to the magnet insertion side. Therefore, the cushioning material 31 can be applied into the magnet insertion hole 24 relatively easily.

Figure 5:
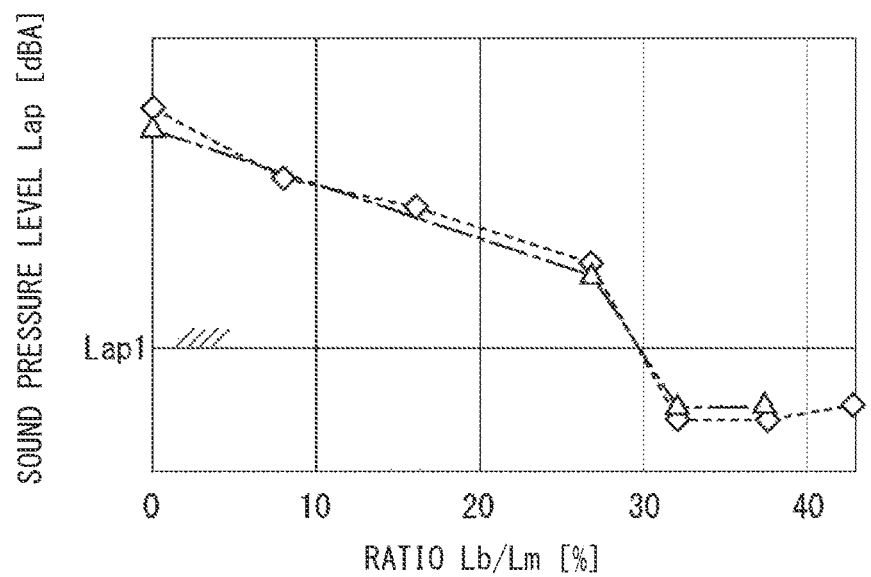
FIG. 5 is a diagram showing a relationship between a ratio of an axial length of a cushioning material to an axial length of a permanent magnet of FIG. 4 and a sound pressure level of abnormal noise.

Further, in the first embodiment, the ratio of the axial length Lb of the cushioning material 31 to the axial length Lm of the permanent magnet 25 is 30% or more. As a result, as shown in FIG. 5, the sound pressure level of abnormal noise due to the collision between the permanent magnet 25 and the wall surface of the magnet insertion hole 24 becomes a predetermined value Lap1 or less. More preferably, the ratio is 32% or more, which is a downward inflection point of the relationship diagram in FIG. 5 between the ratio and the sound pressure level. Therefore, when the cushioning material 31 is provided at the one end 35 of the magnet insertion hole 24 on the magnet insertion side, it is possible to sufficiently reduce abnormal noise.

Second Embodiment

Figure 6:
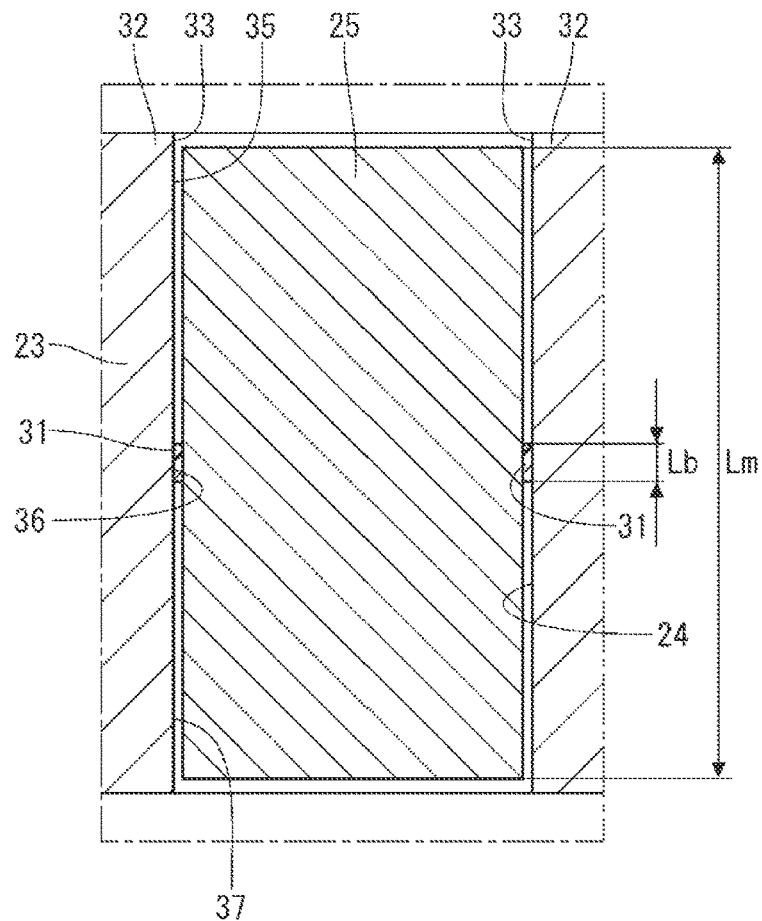
FIG. 6 is a cross-sectional view of an embedded magnet type rotor according to a second embodiment, which corresponds to FIG. 4 of the first embodiment.
Figure 7:
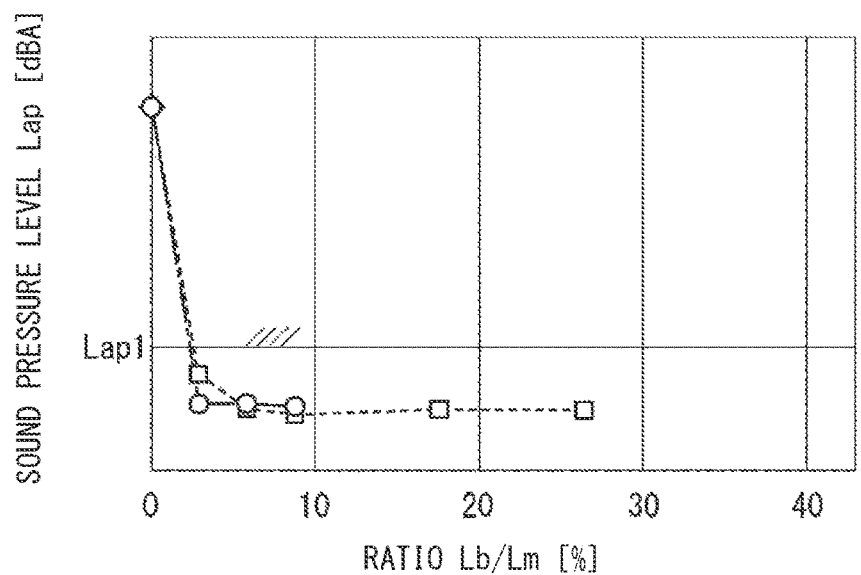
FIG. 7 is a diagram showing a relationship between a ratio of an axial length of a cushioning material to an axial length of a permanent magnet of FIG. 6 and a sound pressure level of abnormal noise.

In the second embodiment, as shown in FIG. 6, the cushioning material 31 is provided at the central portion 36 of the magnet insertion hole 24 in the axial direction of the rotor core 23. The ratio of the axial length Lb of the cushioning material 31 to the axial length Lm of the permanent magnet 25 is 3% or more. As a result, as shown in FIG. 7, the sound pressure level of abnormal noise due to the collision between the permanent magnet 25 and the wall surface of the magnet insertion hole 24 becomes a predetermined value Lap1 or less. In FIG. 7, the ratio of 3% is an inflection point of the relationship diagram between the ratio and the sound pressure level. Therefore, if the cushioning material 31 is very small, it is possible to sufficiently reduce the abnormal noise.

Other Embodiments

Figure 8:
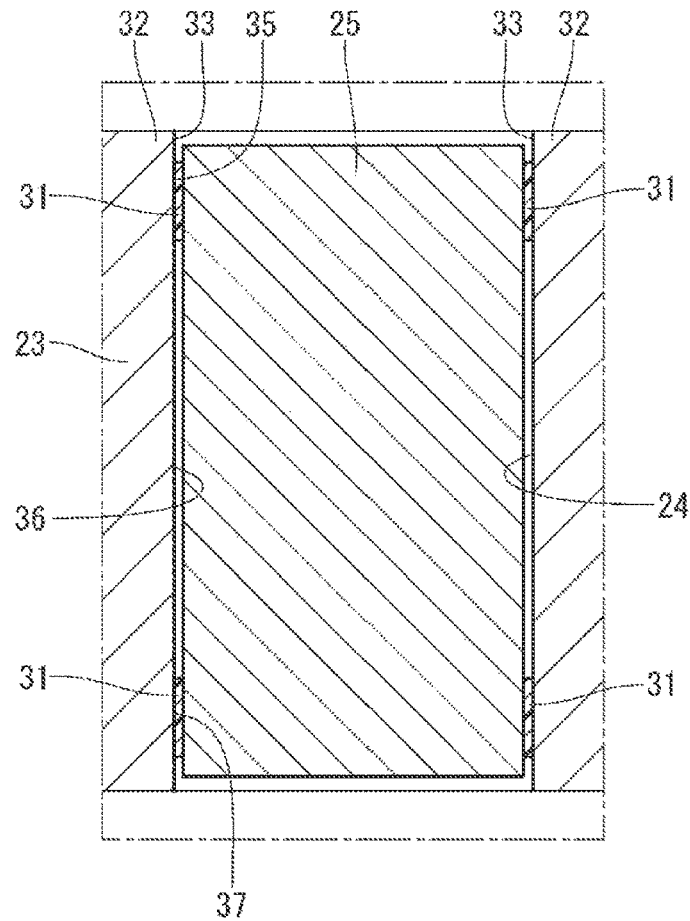
FIG. 8 is a cross-sectional view of an embedded magnet type rotor according to another embodiment, which corresponds to FIG. 4 of the first embodiment.

In another embodiment, the cushioning material may be provided at the other end of the magnet insertion hole away from the magnet insertion side. Further, the cushioning material may be provided intermittently in the axial direction. For example, as shown in FIG. 8, the cushioning material 31 may be provided at both of the one end 35 and the other end 37 of the magnet insertion hole 24. Further, plural cushioning materials may be provided intermittently at a part of the one end, the center portion, or the other end.

In another embodiment, the wall of the magnet insertion hole in the rotational direction may not have a protrusion. Further, the protrusion may be located not only on the radially inner part but also on the central portion or the outer side in the radial direction.

In another embodiment, the cushioning material is not limited to be solidified after the applying, but the cushioning material that has been solidified from the beginning may be fixed on the permanent magnet, or may be provided by inserting between the permanent magnet and the wall surface of the magnet insertion hole.

In another embodiment, the cross section of the permanent magnet is not limited to a rectangle and may have other shapes. Further, the permanent magnet may be arranged so that the width direction intersects the tangential direction of the rotor.

In another embodiment, the cushioning material may be provided on only one side, not on both sides in the rotational direction.

The present disclosure has been described, based on the embodiments. However, the present disclosure is not limited to the embodiments and the structures. The present disclosure also includes various modification examples and modifications within the scope of equivalents. Furthermore, various combination and formation, and other combination and formation including one, more than one or less than one element may be made in the present disclosure.

What is claimed is:

1. A magnet-embedded rotor comprising:
a rotor core made of magnetic material;
a permanent magnet disposed in a magnet insertion hole of the rotor core; and
a cushioning material provided between a wall surface of the magnet insertion hole and the permanent magnet, wherein
the cushioning material is located at least at a location where a distance between the wall surface of the magnet insertion hole and the permanent magnet is the narrowest, on both sides in a rotational direction with respect to the permanent magnet,
no cushioning material is provided on a radially inner side and a radially outer side of the permanent magnet, and
the cushioning material is provided at one end of the magnet insertion hole in an axial direction of the rotor core.

2. The magnet-embedded rotor according to claim 1, wherein a fixing strength of the cushioning material to the rotor core and the permanent magnet in the rotational direction is smaller than a maximum magnetic force acting on the cushioning material in the rotational direction due to an electromagnetic force of a stator.

3. The magnet-embedded rotor according to claim 1, wherein
a wall of the magnet insertion hole on both sides in the rotational direction has a protrusion protruding toward the permanent magnet from a radially inner part of the wall, and
the cushioning material is provided between the protrusion and the permanent magnet.

4. The magnet-embedded rotor according to claim 1, wherein a ratio of an axial length of the cushioning material to an axial length of the permanent magnet is more than or equal to 30%.

* * * * *